March 20, 1928.  1,663,092
A. PARYS
SHEARING MACHINE
Filed May 4, 1926
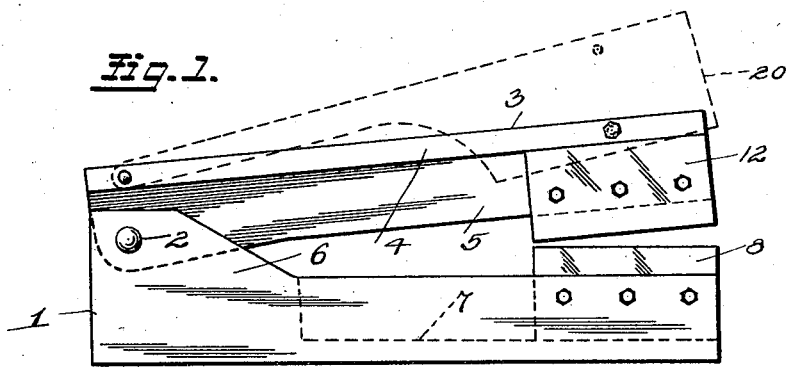
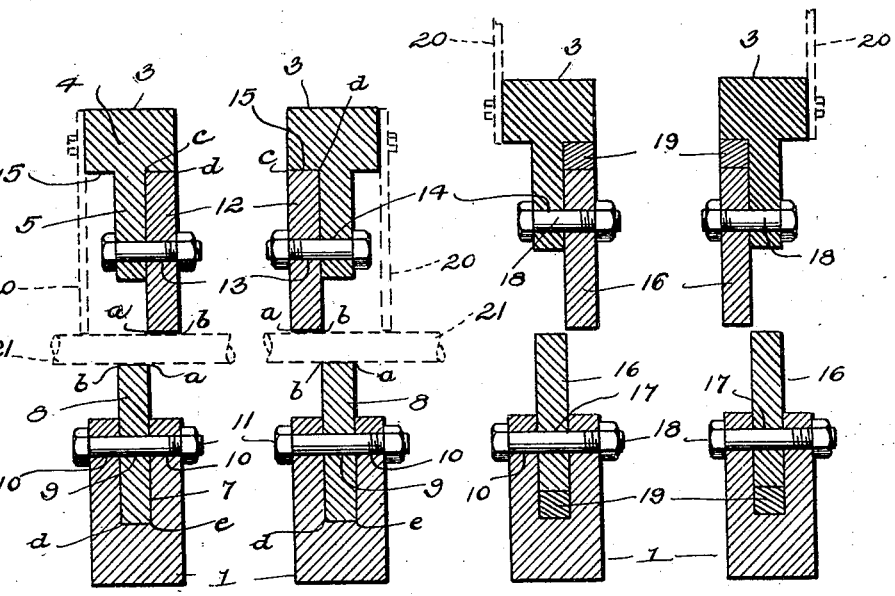
Inventor
*Andy Parys*
By *W. O. McDowell.*
Attorney Patented Mar. 20, 1928.

1,663,092

UNITED STATES PATENT OFFICE.

ANDY PARYS, OF CANTON, OHIO.

SHEARING MACHINE.

Application filed May 4, 1926. Serial No. 106,736.

This invention relates to improvements in shearing machines and has for its principal object the provision of a pair of relatively movable arms carrying at their outer ends removable cutting blades, the arms being provided with a mounting for the blade by which the latter may be adjusted so as to present a plurality of cutting edges, which are materially in excess of the number of cutting edges which the cutting blade presents when used in connection with shearing machines of ordinary construction.

The invention consists in providing one of the cutting arms with a longitudinally extending box or pocket adapted for the reception of a substantially flat shaped cutting blade, and the other of said arms being provided with a depending flange or wall, arranged in registration and in the plane of the pocket in the first named arm, and to which flange there is secured a second cutting blade, arranged to occupy an operative position offset with relation to the working position of the first named blade, the construction of said arm enabling the blade to be turned and reversed, so that each blade will be provided with four cutting edges, instead of but two edges as heretofore provided.

With these and other objects in view, as will appear as the description proceeds, the invention consists in the novel features of construction, combinations of elements and arrangements of parts hereinafter to be fully described and pointed out in the appended claims.

In the accompanying drawing:

Figure 1 is a side elevation of a pair of shearing arms provided with cutting blades constructed and arranged in accordance with the present invention, Figure 2 is a vertical sectional view in a transverse plane taken through the arms of the cutting blades and showing the latter in one of their working positions, Figure 3 is a similar view disclosing the blade in a second working position, Figure 4 is a transverse sectional view disclosing a slightly modified form of the invention with the cutting blades thereof in one position of adjustment, Figure 5 is a similar view showing the cutting blade at the construction illustrated in Figure 4 in another working position.

In the accompanying drawing the numeral 1 designates the stationary arm of a power operated shearing machine of the type used, for example, in the cutting and severing of metal. Pivoted to one end of the arm as at 2 is a movable arm 3, which is adapted to be oscillated about the axis of the pivot 2 by any suitable means (not shown). In transverse cross section the arm 3 is substantially of T-shaped form, including an enlarged head 4 and an integral depending flange or wall 5. This flange is positioned between the transversely spaced wall 6 of the lower arm 1 so as to permit of the pivotal connection as at 2 and also to retain the arms 1 and 3 in vertical alignment throughout all relative positions of operation.

The wall 6 at the forward end of the arm 1 defines a socket or slot 7, which extends longitudinally of the length of the arm 1 in the center of the latter. This socket is adapted to receive a cutting blade 8, which is preferably of block form and is provided centrally with a plurality of openings 9, arranged in registration with similar openings 10 formed in the arm 1. Adapted to pass through the openings 9 and 10 are fastening devices in the form of bolts 11, which serve to securely retain the cutting blades in rigid yet removable relationship with the arm 1. Similarly, the upper arm 3 is provided with a cutting blade 12, corresponding in shape and formation to the blade 8. The blade 12 is provided with a plurality of centrally located openings 13, arranged to register with similar openings 14 provided in the depending web or flange 5 of the movable arm 3.

It will be observed that the flange or web 5 is positioned and located in the plane of the socket 7 or of the lower cutting blade 8, whereas the upper cutting blade is secured to one side or the other of the flange 5 and is thus located in an offset plane with respect to the lower cutting blade. By this arrangement it will be observed that the cutting edges of the blade are accurately positioned so as to act effectively for shearing purposes on the work positioned between them. The upper arm 3 is provided with laterally arranged shoulders 15, against which the upper edges of the blade 12 engage, and which shoulders receive the thrust imparted to the blades, rather than in absorbing such thrust by the fastening elements. Similarly, the lower blade 8 rests in the bottom of the slot 7 so that the thrust imparted to this blade may be absorbed by the arm 1.

Through the provision of the construction described it will be observed that the position of the cutting blades may be reversed, at will, so as to present a multiplicity of cutting edges to the work, whereby when one set of edges is dulled another set may be presented without requiring repeated grinding of the cutting blades. Thus in Figure 2 the cutting edges a—a are presented to the work, while by shifting the blade to assume the position shown in Figure 2 the cutting edges b—b may be presented to the work. Thus, since the fastening elements are located in the center of the blades, the latter may be reversed so as to present the cutting edges c—c and d—d. In Figures 4 and 5 provision is made for the employment of cutter blades 16 of previous design, wherein the openings 17 for the reception of the binding elements 18 are located adjacent one set of cutting edges to a greater extent than they are to the opposed set of cutting edges. In order to make use of these previous types of blades it is merely necessary to employ in conjunction therewith a plurality of filling blocks 19, which serve to render the cutting blades reversible and to permit of their proper retention in connection with the arms 1 and 3. If desired, the arm 3 may be provided with a plate 20 to prevent the raising of the work 21 when the shearing operation takes place.

What is claimed is:

1. In a shearing machine, a pair of relatively movable frames, one of said frames being formed with a longitudinal socket opening to the upper side thereof, a flat cutter bar mounted in said socket, fastening elements extending transversely through the walls of said socket and through said cutter bar to reversibly retain the latter in said socket, the other of said frames being formed with a depending web arranged in the place of said socket, a second flat cutter bar, and fastening appliances for uniting said last named cutter bar to either of the vertical side walls of said web, said appliances passing transversely through said web and the last named cutter bar.

2. In a shearing machine, a pair of relatively movable frames, one of said frames being formed with a longitudinal socket opening to the upper side thereof, a flat cutter bar mounted in said socket fastening elements extending transversely through the walls of said socket and centrally through said cutter bar to reversibly retain the latter in said socket, the other of said frames being formed with a depending web arranged in the place of said socket, a second flat cutter bar, and fastening appliances for uniting said last named cutter bar to either of the vertical side walls of said web, said appliances passing transversely through said web and transversely and centrally through the last named cutter bar.

In testimony whereof I affix my signature.

ANDY PARYS.